United States Patent
Summer et al.

[15] 3,692,144
[45] Sept. 19, 1972

[54] FLUID DISTENSIBLE TRUSS

[72] Inventors: James R. Summer; Randall F. White, both of Brielle, N.J.

[73] Assignee: The Garrett Corporation, Los Angeles, Calif.

[22] Filed: Nov. 18, 1970

[21] Appl. No.: 90,819

Related U.S. Application Data

[63] Continuation of Ser. No. 815,887, April 14, 1969, abandoned.

[52] U.S. Cl. .................................. 182/48, 193/25 B
[51] Int. Cl. ......................... A62b 1/20, B65g 11/10
[58] Field of Search ..... 182/48; 193/25 B; 244/137 R

[56] References Cited

UNITED STATES PATENTS

| | | |
|---|---|---|
| 3,070,203 | 12/1962 | Hailstone .................... 182/48 |
| 3,473,641 | 10/1969 | Fisher ...................... 193/25 B |
| 3,476,338 | 11/1969 | Fisher ............................ 14/72 |
| 3,463,915 | 8/1969 | Day ....................... 244/137 R |

*Primary Examiner*—Reinaldo P. Machado
*Attorney*—Orville R. Seidner and John N. Hazelwood

[57] ABSTRACT

Inflatable apparatus has a ramp body which is deployable over an aircraft wing as a walkway having a fabric walkway surface configured as essentially flat by tensioned partition strips in the ramp body, imparting to its walkway surface a slightly arcuately ribbed configuration. An inflatable slide body coupled to an end of the ramp body may support the ramp body end, or alternatively the end may be supported by an integral inflatable column body portion extending from the ramp end to the ground.

20 Claims, 5 Drawing Figures

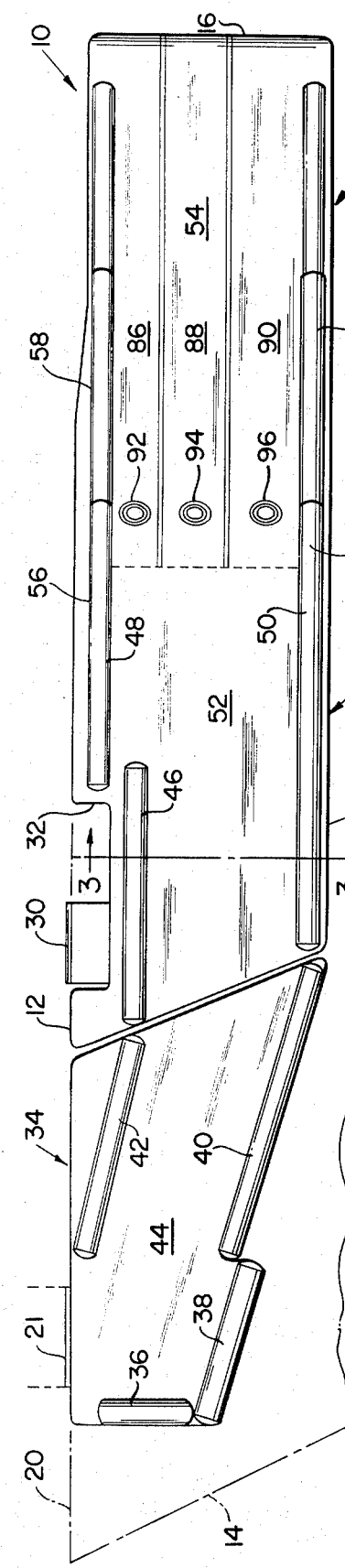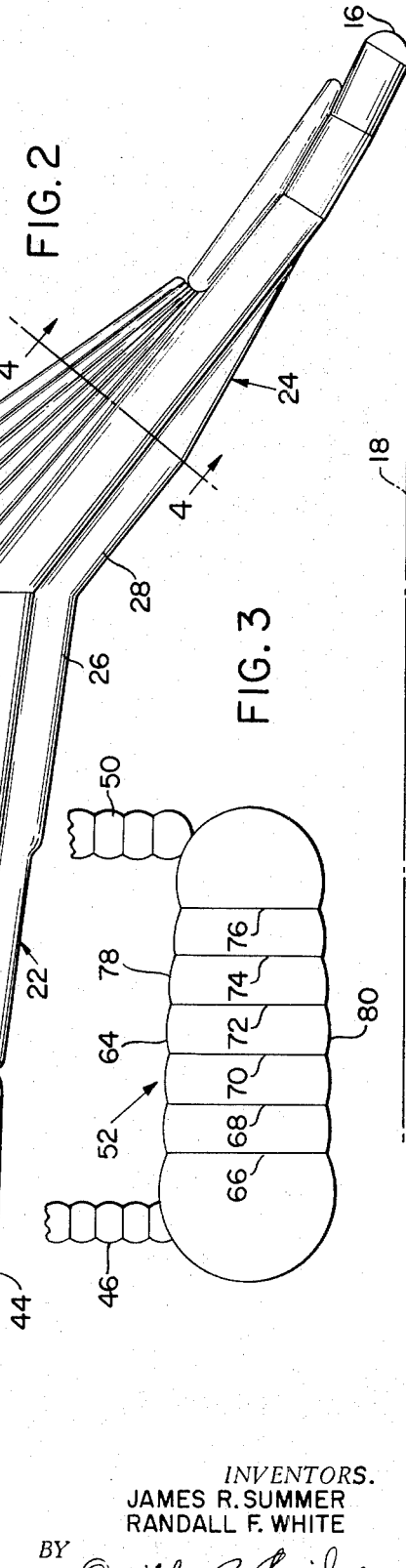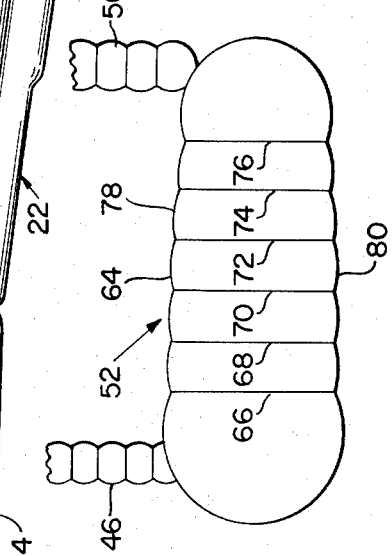

form no part of the invention.

FLUID DISTENSIBLE TRUSS

Cross-Reference To Related Application

This application is a continuation of our pending application Ser. No. 815,887, entitled "Fluid Distensible Truss", filed April 14, 1969, now abandoned.

BACKGROUND OF THE INVENTION

This application is a continuation of Ser. No. 815,887 filed Apr. 14, 1969 and now abandoned.

This invention relates in general to inflatable apparatus and is particularly concerned with inflatable and deployable apparatus adapted to the emergency escape of persons from an elevated egress hatchway to a ground plane. More specifically, the invention is directed to an inflatable walkway body and slide combination, deployable from a stowed location on an aircraft to enable evacuees to escape from a door or other opening over a wing of the craft.

In the prior art, it has been customary for commercial airlines to provide inflatable escape slides stowed uninflated adjacent the ingress and egress doorways of the aircraft to facilitate passenger evacuation in the event of an emergency. When the door is opened in an emergency condition, the slide is erupted from its stowed position and deployed inflation with a gaseous fluid provided from a pressurized fluid source, whereafter the passengers leave through the door and jump onto the slide and are chuted to the ground.

However, in the larger craft now in development and soon to be in airline use, it happens that emergency egress hatchways or doors are located at fuselage stations which open out over the wings, in addition to the usual doorways for embarking and debarking passengers. If it is assumed that the passengers are initially enabled to evacuate the aircraft onto the wings, there remains the problem of transferring them to the ground from the wing surface which is elevated at some distance above the ground. The problem is complicated by the fact that the leading and trailing edges of the wings are usually provided with positionable slats, flaps, brakes, and the like which may be extended in any one of several landing or takeoff positions at the time of the emergency and thus present hazardous areas for ambulating passengers. It is obvious from a situation of this type that inflatable slides of the prior art are not suited to useful deployment as per past custom.

Furthermore, the top surface of the wing may be disposed quite some distance lower than the sill of the emergency egress hatchway, presenting a hazard to evacuating persons from that cause. The invention disclosed herein solves these problems, as hereinafter pointed out.

SUMMARY OF THE INVENTION

Briefly, the invention provides an inflatable ramp body which, upon inflation, deploys from adjacent an emergency egress hatchway over the wing of an aircraft to a point at least somewhat outboard thereof where a slide body depends therefrom. The ramp body, although comprised of fluid-distensible, flexible-walled construction, including the top surface thereof, nevertheless provides an essentially flat walkway surface from the egress hatchway to the slide. In one embodiment, the ramp and slide bodies are formed integrally so that the slide body supports the free end of the ramp body as well as providing the evacuation chute. In another embodiment, an inflatable columnar support portion integrally formed on the free end of the ramp body, performs the support function, and a separate slide body has one end attached to the ramp and columnar body.

An important feature of the invention is that the ramp body is formed in a mattress-like configuration which may have an inflated thickness which brings the walkway surface up to, or at least adjacent to the sill of the egress hatchway. The mattress-like bed of the ramp body is formed with a plurality of longitudinally extending partition strips of fabric material adapted to be stressed in tension to retain the walkway surface fabric in essentially flat condition. Thus the surface looks inviting to walk on, and even though the surface is comprised substantially of an impervious fabric material, to a very large extent it resists dimpling by the high unit loads impressed on it by persons ambulating thereon. The dimpling resistance is achieved by the pressure of inflation plus the tension resistance in the walkway fabric achieved by the nature of the configuration of the body. The body also comprises a fluid trussed structure which resists bending deflection between the support points.

BRIEF DESCRIPTION OF THE DRAWINGS

FIG. 1 is a plan view of one form of the apparatus utilizing the invention;

FIG. 2 is a side elevation view of the apparatus of FIG. 1;

FIG. 3 is a schematic of a cross-section view taken on the line 3—3 of FIG. 1;

DESCRIPTION OF THE PREFERRED EMBODIMENTS

Figure 4:
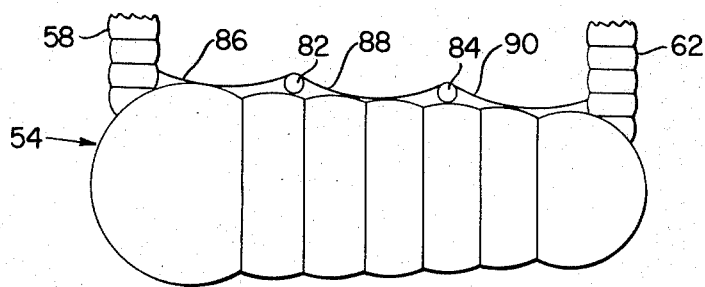
FIG. 4 is a schematic of a cross-section view taken on the line 4—4 of FIG. 2

Referring to FIGS. 1 and 2, there is illustrated an inflated and deployed escape apparatus 10 having one end 12 thereof disposed on and supported by structure 14 (FIG. 1) and the other end 16 adjacent the ground plane surface 18, the structure 14 being elevated above the ground plane 18. The structure 14 is illustrated merely schematically by dot-dash lines, and may be a wing of an aircraft, for example, extending outwardly from the side of the fuselage thereof, designated schematically by the reference numeral 20. The aircraft (not shown) may have an emergency exit door 21 over the wing structure 14, but it will be appreciated that the aircraft, together with its wing and the escape door thereover, are merely by way of example and form no part of the invention, hence require no detailed description. The essence of the invention is that provision is made for the rapid escape of persons from an elevated structure to a lower ground plane, whether the elevated structure is mobile such as an aircraft or is a fixed structure such as a building.

The apparatus 10 is an inflatable device having fluid distensible, flexible walled construction comprising a first ramp body 22 and a second slide body 24. It is apparent that the end 12 of the apparatus 10 is also one end of the ramp body 22, the other end 26 of which is coupled to the upper end 28 of the slide body 24. The apparatus 10 is attached to the structure 14 by a girt 30 which is secured to the fuselage 20 of the aircraft, details of the means of attachment being well-known by those skilled in the art and requiring no detailed description herein. As will also be appreciated by those skilled in the art, when the apparatus 10 is uninflated, it is adapted to being folded and stowed in a compartment in the aircraft fuselage 20 adjacent the attachment point for the girt 30. Subsequent inflation of the apparatus 10 upon opening the compartment results in eruption of the apparatus 10 from the compartment and the deployment of the apparatus by the initial inflation of the ramp body 22, followed closely in time by the inflation of the slide body 24. Successive inflations of the bodies 22 and 24 assure the proper directional deployment of them, thereby minimizing the possibility of the slide body 24 from tucking under the wing structure 14.

The body 22 may be notched, as for example by means of a notch shown as 32, to accommodate the deployment from the aircraft fuselage of inlation means (not shown) to effect inflation of the bodies 22 and 24. Such means for inflation, together with accessory inflating tubes, aspirators, and the like, are well known to those skilled in the art. Since they form no part of the invention, there is no need to illustrate and describe them in detail.

A separate inflatable walkway ramp body 34 is provided to effect an egress walkway from the door 21 to the free end 12 of the ramp body 22. As was the case with the apparatus 10, the body 34 is adapted for uninflated stowage in a compartment from which it erupts, upon the initiation of the inflation procedure. The body 34 is provided with inflatable handrails 36, 38, 40 and 42 which erect themselves upon inflation of the bed 44 of the body 34. It will be observed that the respective ramp bodies 22 and 34 have no connection to each other inasmuch as they are separately stowed in individual compartments, and may be inflatable from separate pressure fluid sources.

The apparatus 10 is provided with inflatable handrails 46, 48 and 50 which are erected upwardly from the bed 52 of the ramp body 22 and the slideway bed 54 of the slide body 24 upon inflation of the apparatus 10. The rail 48 comprises a ramp body rail portion 56 which merges with a slide body rail portion 58, and the rail 50 is similarly comprised of merging portions 60 and 62, as best seen in FIG. 2.

The structural arrangement of the beds 44 and 52 of the bodies 34 and 22 forms and important feature of the invention. As best seen in FIG. 3, the inflation bed 52 defines a walkway surface 64 which is essentially flat, the surface being just slightly convexly ribbed by reason of the inflated impervious fabric bounding the bed 52 and the longitudinally extending fabric partition strips 66, 68, 70, 72, 74 and 76 which provide tension-tie means between the walkway surface fabric 78 and the bottom enveloping fabric portion 80 of the bed 52. The bed 52 is thus configured into a mattress-like walkway structure in which the high unit loading stresses, occasioned by the feet of persons ambulating thereover are reacted against by both the fluid pressure in the bed 52 and the surface tension stresses in the walking surface fabric 78 adjacent the areas of high unit loads. Hence the surface fabric 78 deflects only slightly under the high unit loads. Walkway bed 44 of the body 34 is similarly configured.

It will be evident that the approach to flatness of the surface 64 will be essentially an inverse function of the spacing apart distance of the partition strips 66 to 76, wherefor the height of the arc of the longitudinal ribs above the roots thereof, at the joinder lines of adjoining ribs, decreases as the distance between the roots decrease. However, the mere fact of the walkway surface 64 having a convexly ribbed configuration does not detract psychologically from the acceptance to persons of the surface for walking purposes providing the arc height to length ratio is not too great. In one embodiment other than the one illustrated, having a walkway total width of about 42 inches provided by a surface comprised of four ribs having root chord spacings of about 10½ inches each, an acceptable rib height above root was found to be about 2 inches. In such a case the height to width ratio of the ribs was just slightly less than about 1:6. It should noted that the overall inflated thickness of the mattress-like bed of the said other embodiment was of the order of 16½ inches.

In the embodiment illustrated in FIG. 3, the rib height above root is somewhat less than that of the previously mentioned other embodiment. It can be said that a rib height to root width ratio of 1:6 represents very nearly the smallest acceptable ratio, and that ratios greater than 1:6 (say 1:10, or even larger) would probably be more appropriate from a psychologically acceptable viewpoint. Thus, for the purpose intended, it can also be said that an essentially flat surface, as intended herein, can be defined as a walkway surface imposing little or no apprehension or psychological negativity on persons who might be committed to traversing the surface under the stress of an emotional pitch occasioned by a forced evacuation from an aircraft downed under emergency conditions.

It is apparent, of course, that the convexly ribbed surface need not be longitudinal in the direction of walking. Thus, instead of the partition strips 66 to 76 extending from end edge to end edge, the bed 52 could be fabricated with crosswise or transversely disposed partition strips extending from side edge to side edge. In this case it is evident, however, that the ribs would be presented broadside to the persons ambulating thereover, and might present additional stumbling hazards.

As viewed in FIG. 1, the apparatus 10 may be considered as extending from a support portion adjacent a trailing edge of the wing 14 of the aircraft alongside the fuselage 20 toward the aft end thereof. As is well known, aircraft wings are provided at the trailing edge with positionable flaps which are usually extended from their fully retracted position by the pilot for takeoff and landing procedures. Hence it is apparent that an emergency escape chute for an aircraft cannot be deployed directly from the trailing edge of the wing of the aircraft.

To this end, the present invention provides in one inflatable apparatus 10 the ramp body portion 22 supported at spaced apart points, the one end 12 supported by the structure 14 and the other end 26 supported by the slide body 24. It is apparent from FIGS. 1, 2 and 3 that the ramp body 22 comprises a fluid trussed structure which is adapted to supporting persons ambulating across the surface 64 thereof without substantial bending deflection of the ramp body and without undue dimpling of the surface fabric 78 by the high unit loads imposed thereon. Since the handrails 46, 48 and 50 extend from the sides of the body 22, additional support against deflection is provided to the body 22.

As was stated, the ramp body 22 is coupled to and merges with the slide body 24. Essentially, with the construction shown, the slide body 24 may be considered as an angled extension of the ramp body 22, with the slide bed 54 thus being an extension of the ramp bed 52.

As seen in FIG. 4, the slide bed 54 also includes a slide surface fabric 80 disposed substantially between the handrails 58 and 62 and extending from the upper end 28 to the lower end 16 of the slide body 24. The bed 54 also comprises on its top face two inflatable tubes 82 and 84 which underlie the surface fabric 80 and impart to the latter the longitudinally extending arcuate concave surfaces 86, 88 and 90 to establish three separated arcuate chutes to accommodate three persons in side-by-side sliding relationship on the slide body 24.

As the persons traverse the ramp body 22 toward the end 26, they are induced to jump therefrom onto the slide body 24 by "bullseye" targets 92, 94 and 96 imprinted on the respective surfaces 86, 88 and 90 as best seen on FIG. 1, which targets incorporate appropriate psychological principles to induce people to "hit-the-spot" and thus enhance the flow and movement characteristics of the apparatus.

Figure 5:
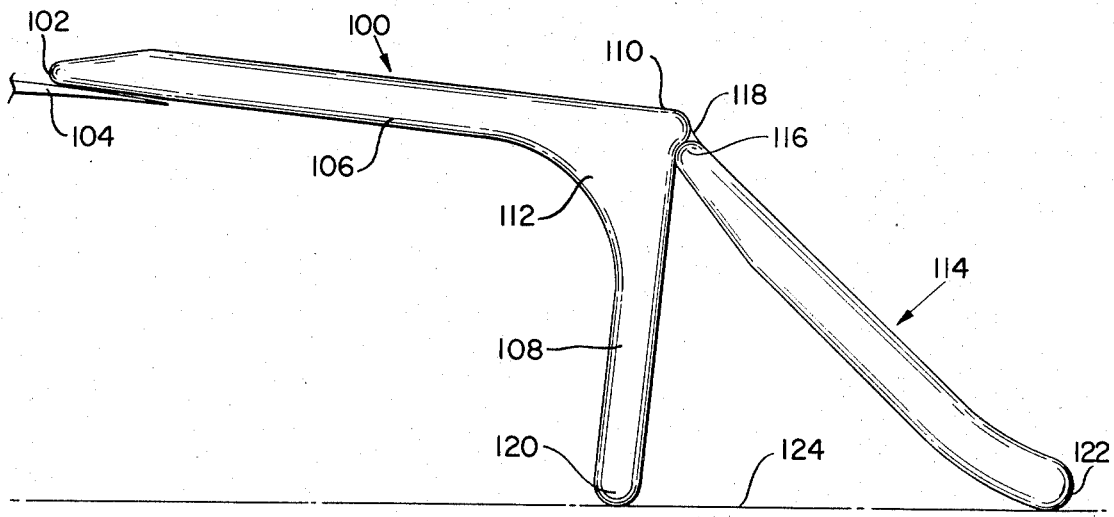
FIG. 5 is a side-elevation view in schematic form illustrating another embodiment of the invention.

The other embodiment of the invention illustrated in FIG. 5 is shown as comprising a flexible walled, fluid distensible ramp walkway apparatus 100 having one end 102 supported on a structure schematically illustrated as the trailing edge 104 of an aircraft wing (not otherwise shown). The ramp apparatus 100 comprises a mattress-like bed body 106 merging into a support body 108 disposed at the end 110 of the bed body 106. Thus the walkway bed body 106 is supported at its spaced apart ends 102 and 106, the distance therebetween representing the distance essential to a clearance of the wing flaps in whatever extended position they may happen to have at the time of inflation of the apparatus 100. While the merger 112 of the bed and support bodies 106 and 108 is shown as fixing the angle between the bodies at about 90°, it is apparent that this angle may be fixed at any desirable angle other than 90°. It will be observed that both the bed 52 of the embodiment of FIG. 2 and the bed 106 of FIG. 5 are inclined slightly downwardly from fore to aft ends in order to encourage the rapid movement of persons to the slide, which in the case of FIG. 5 is illustrated more or less schematically at reference 114. The slide 114 may be of any preferred type or configuration having its upper end 116 secured, for example, by a girt 118 to the end 110 of the body 106. The ends 110 and 116 of the body 106 and slide 114 communicate through the walls thereof in known manner so that inflation of the slide 114 may be effected by fluid supplied to the apparatus 100. The said communication may be controlled so as to assure near total inflation and deployment of the apparatus 100, before any substantial deployment of the slide 114 occurs, in order to minimize the possibility of hang up or tuck under of the apparatus and slide, as will be known to and appreciated by those skilled in the art. When fully inflated and deployed, the apparatus 100 and slide 114 have their respective lower ends 120 and 122 disposed adjacent the ground plane 124.

It is apparent, of course, that the apparatus 100 of FIG. 5 may be provided with inflatable handrails to be inflated erect from the bed body 106 and the slide 114, similar to the handrails illustrated for the embodiment of FIGS. 1–4. We claim:

1. Apparatus for the egress of personnel to a ground plane surface from a structure having an egress hatchway elevated above the surface comprising:
    a. a first fluid distensible body deployable by fluid inflation from a stowed to a deployed position,
        said body arranged to have a first end portion supported adjacent said egress hatchway and a second end portion extending away therefrom when inflated and deployed,
        said body thereby providing for personnel a first passageway surface from said hatchway;
    b. a deployable second body having one end thereof coupled to said first body adjacent said second end portion thereof,
        said second body being deployable with said first body from stowed to a deployed position with the other end of said second body deployed adjacent said ground plane surface; and
    c. means defining a second surface on said second body for the passage of personnel from said first surface to said ground plane, said first and second bodies cooperating to support said second surface in an inclined position having a greater slope than said first surface.

2. The apparatus of claim 1 in which said first surface is substantially horizontal upon inflation and deployment of said bodies, and said first body provides a substantially vertical support column upon inflation and deployment thereof.

3. The apparatus of claim 1 including inflation means for inflating said first and second bodies, said inflation means providing inflation of said bodies by said inflation means is progressive with inflation of one of said bodies being initiated before inflation of the other of said bodies.

4. Apparatus for the emergency escape of personnel to a haven surface from an egress hatchway elevated above the surface, comprising:
    a. a fluid distensible structure deployable by fluid inflation from a stowed to a deployed position,
        said structure having body members disposed at an angle to each other,
        one of said members arranged when inflated and deployed to have one end thereof supported substantially adjacent said hatchway and the other end thereof supported above said haven surface by said other body member,
        said one of said members thereby providing for escaping personnel a first passageway surface from said hatchway;
    b. means for inflating said structure; and
    c. deployable slide means having one end coupled to said structure,
        said slide means being deployable with said structure from stowed to a deployed position with the other end of said slide means deployed adjacent said haven surface, said slide means providing a second passageway surface for escaping personnel, said second surface having a greater slope than said first surface.

5. The apparatus of claim 4 in which said first surface is essentially flat and said second surface extends downwardly therefrom at an angle.

6. The apparatus of claim 4 in which said slide means is comprised of an inflatable fluid distensible member and means are provided for the fluid inflation thereof.

7. The apparatus of claim 6 in which said means for inflating said body and said member are arranged such that initiation of inflation of said body precedes initiation of inflation of said member whereby substantial deployment of said body occurs before deployment of said member.

8. Apparatus for emergency escape of personnel to a haven surface from an emergency exit elevated above the surface, comprising:
 a. a first fluid distensible body deployable by fluid inflation from a stowed to a deployed position,
  said first body arranged when inflated and deployed to have a first end portion thereof supported adjacent said exit and a second end portion extending away from said exit,
  said inflated and deployed first body thereby providing for escaping personnel a first passageway surface from said exit;
 b. a second fluid distensible body deployable by fluid inflation from a stowed to a deployed position,
  said second body having one end thereof coupled to said second end portion of said first body and adapted when inflated and deployed to provide a substantially columnar support between said second end portion of said first body and said haven surface;
 c. deployable slide means having one end thereof coupled to said first body adjacent said second end portion thereof,
  said slide means being deployable with said bodies from stowed to a deployed position with the other end of said slide means deployed adjacent said haven surface,
  said slide means providing a second passageway surface for escaping personnel, said second surface having a greater slope than said first surface and
 d. means for inflating said bodies.

9. An inflatable walkway apparatus for the ambulation of persons from end to end thereof comprising:
 a. impervious fabric means defining a walkway surface extending transversely from side to side and longitudinally from end to end of said apparatus;
 b. wall means extending from the side and end edges of said fabric means to form therewith, when inflated, a mattress-like configured walkway bed adapted to retain a fluid pressure above that of ambient as substantially the sole resistance to dimpling of said fabric means by the mass loading of persons ambulating across said walkway surface; and
 c. tension tie means disposed within said bed and coupling said wall means to said fabric means for restraint of said fabric means against excessive ballooning and thereby configuring said fabric means as an essentially flat walking surface,
 said apparatus being supportable at two spaced apart points, and said fabric means forms with said wall means, when said apparatus is inflated, a fluid trussed structure adapted to support ambulating persons without substantial bending deflection of said structure between said points, said spaced apart points of said apparatus being adjacent said ends thereof, support for one of said ends being comprised of an inflatable walled body which when inflated, extends angularly from said one of said ends to a ground plane support surface.

10. Inflatable evacuation device comprising:
 a. an elongated fluid distensible, flexible walled body, said body when inflated being distended in the form of a truss;
 b. attaching means for attaching said body to a structure adjacent one end of said body, the opposite end of said body being adapted to rest on a surface at an elevation spaced downwardly from said attaching means;
 c. said body when inflated having a walkway surface adjacent said one end and a slide surface adjacent said opposite end, said slide surface joining said walkway surface at a junction between said ends;
 d. said body when inflated being capable of maintaining said walkway surface substantially horizontal and said slide surface in downward sloping relation while evacuating persons are supported on said walkway and slide surfaces.

11. The inflatable evacuation device according to claim 10 wherein said attaching means is arranged along one side of said body, whereby the length of said body extends laterally from said attaching means.

12. The inflatable evacuation device according to claim 11 wherein said attaching means includes a girt extending outwardly from said side of said body, said girt being spaced from said junction between said walkway surface and said slide surface.

13. The inflatable evacuation device according claim 10 including inflatable handrails projecting upwardly along opposite sides of said body, said handrails extending across said junction and providing additional support against deflection of said body.

14. The inflatable evacuation device according to claim 10 wherein said slide surface includes a flexible sheet superimposed on said body, and includes an elongated support member extending longitudinally of said body, said support member being interposed between said sheet and said body, whereby said support member divides said slide surface into a plurality of side-by-side chutes.

15. The inflatable evacuation device according to claim 14 wherein said body includes internal tie means limiting expansion of said body in response to inflation fluid pressure, said tie means being coextensive with said walkway surface and said slide surface, whereby both of said surfaces have a substantially greater width than thickness, and said walkway surface being substantially flat.

16. The inflatable evacuation device according to claim 10 wherein said body includes an inflatable support member projecting downwardly from adjacent said junction, the lower end of said support being adapted to rest on a surface at an elevation spaced downwardly from said attaching means, said support maintaining said junction at a predetermined elevation relative to said support lower end.

17. The inflatable evacuation device according to claim 16 including an inflatable walkway ramp adjacent said one end of said body, said ramp having a walkway surface adapted to be aligned with said walkway surface of said body.

18. The inflatable evacuation device according claim 17 wherein said walkway ramp includes a pair of inflatable handrails spaced apart across said ramp surface and defining a continuous passage from adjacent one end of said ramp to the opposite end of said ramp.

19 The inflatable evacuation device according to claim 17 including means for independently inflating said body and said ramp.

20. The inflatable evacuation device according to claim !10 wherein said body maintains said junction substantially rigid when said body is inflated.

* * * * *

UNITED STATES PATENT OFFICE
CERTIFICATE OF CORRECTION

Patent No. 3,692,144          Dated September 19, 1972

Inventor(s) James R. Summer, Randall F. White

It is certified that error appears in the above-identified patent and that said Letters Patent are hereby corrected as shown below:

Column 6, lines 42 and 43, delete "by said inflation means is progressive".

Column 8, line 9, after "inflatable" insert --flexible--.

Column 10, line 8, delete "!".

Signed and sealed this 23rd day of January 1973.

(SEAL)
Attest:

EDWARD M. FLETCHER, JR.          ROBERT GOTTSCHALK
Attesting Officer                 Commissioner of Patents

FORM PO-1050 (10-69)